United States Patent

[11] 3,613,823

| | | |
|---|---|---|
| [72] | Inventor | Eric C. Burrage<br>Pearland, Tex. |
| [21] | Appl. No. | 837,797 |
| [22] | Filed | June 30, 1969 |
| [45] | Patented | Oct. 19, 1971 |
| [73] | Assignee | Shell Oil Company<br>New York, N.Y. |

[54] DOUBLE-BUBBLE SPARK ARRAY
6 Claims, 8 Drawing Figs.

[52] U.S. Cl. .................................................. 181/0.5,
340/9, 340/12
[51] Int. Cl. .................................................. G01v 1/00
[50] Field of Search .......................................... 181/0.5
NC, 0.5; 340/12

[56] References Cited
UNITED STATES PATENTS

| | | | |
|---|---|---|---|
| 3,245,032 | 4/1966 | Knott et al. ................... | 340/12 |
| 3,251,027 | 5/1966 | Huckabay et al. ............ | 340/15.5 |

*Primary Examiner*—Rodney D. Bennett, Jr.
*Assistant Examiner*—H. A. Birmiel
*Attorneys*—Theodore E. Bieber and J. H. McCarthy ABSTRACT: A spark-type seismic sound source for use in water-covered areas wherein electrical power is discharged through a plurality of electrodes without the use of a ground plate.

PATENTED OCT 19 1971 3,613,823

INVENTOR:
E. C. BURRAGE

INVENTOR:
E. C. BURRAGE

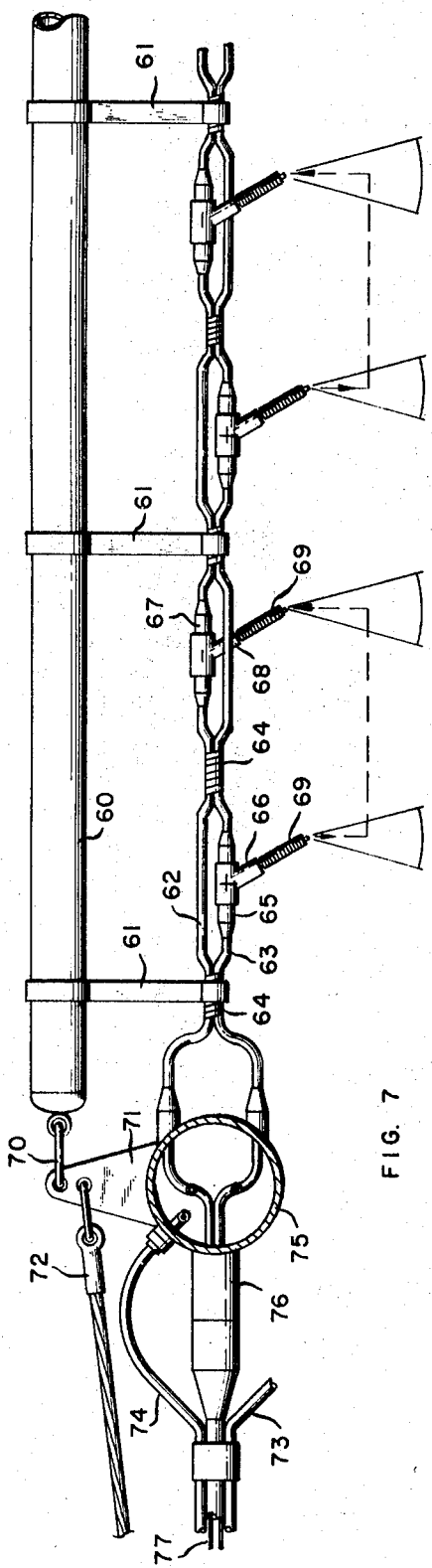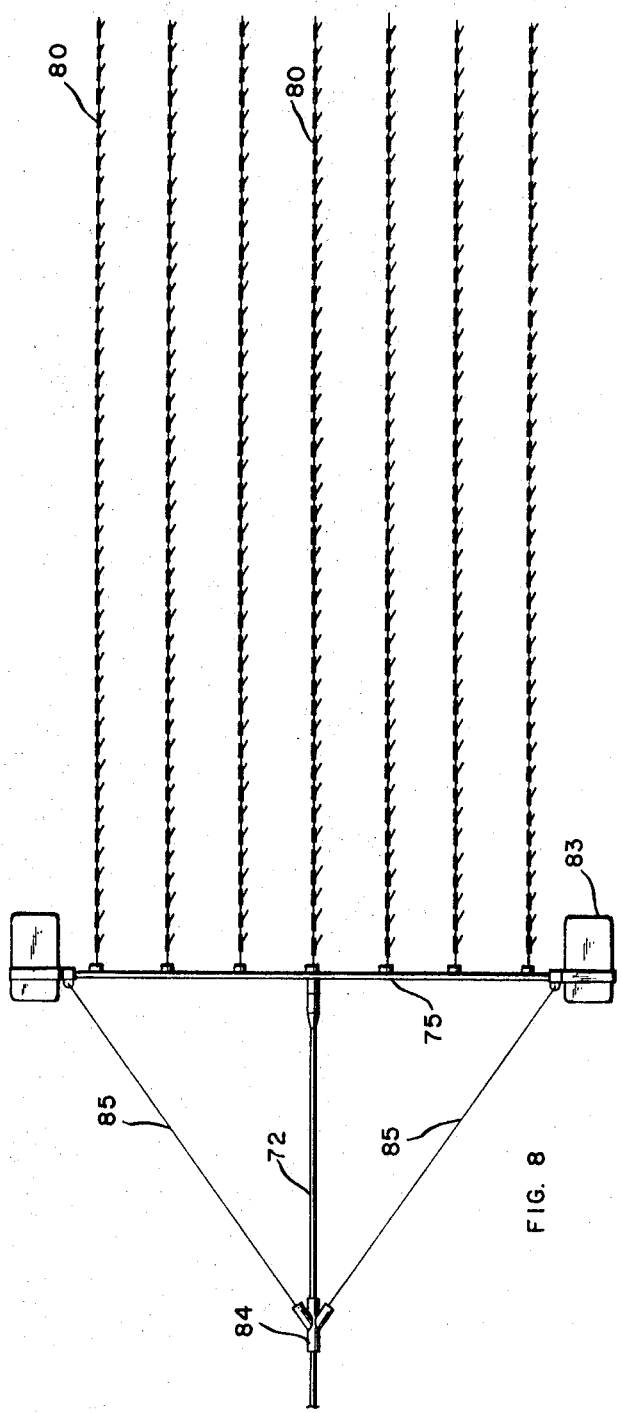

DOUBLE-BUBBLE SPARK ARRAY

BACKGROUND OF THE INVENTION

The present invention relates to seismic exploration and particularly to a sound source for use in conducting surveys over water-covered areas. Seismic surveys conducted over water-covered areas use one of three general methods, In one method conventional powder or dynamite sources are used wherein a charge is placed in the water and detonated at the described time with resulting creation of a large pressure wave. The seismic signals reflected from subsurface geological formations and structures are received by seismometers and recorded. In a second method explosive gas mixtures are introduced into confined areas and ignited to create a detonation or explosion that is used as a source of seismic energy. Also, grouped with this second type of sound source as those that use compressed gases such as compressed air to displace the water and create pressure waves. The third method uses an electrical discharge or spark to ionize a portion of the water surrounding the electrodes to create a pressure wave. Also, in the case of a spark discharge due to the high temperature at the electrodes, a portion of the water is converted to steam which adds to the pressure wave.

In all three methods it is customary to tow a string of detectors through the water in the vicinity of the sound source to detect the signals that are reflected from the various subsurface formations and structures. The detected signals are recorded on suitable equipment contained on the towing vessel, either in the form of analog or digital signals. Also at times the signals are recorded as variable area signals to provide a profile of the surveyed area. The latter recording is similar to those obtained with conventional depth-sounding equipment.

All of the above sound sources have various disadvantages, and thus none is completely suitable for use in all circumstances. For example, the use of conventional dynamite or powder as a source creates several problems in handling and detonating the charges, The handling of an explosive material is, of course, dangerous, while the explosions themselves tend to kill marine life. Also, in the case of dynamite two separate vessels are required; one for handling the dynamite and the other for the recording equipment. This, of course, increases the cost of the survey, The use of explosive gas mixture solves some of the problems that arise with dynamite, since explosive gas mixtures do not kill marine life. Normally, gas mixtures can be stored as separate, nonexplosive gases on the same vessel that contains the recording equipment. Thus, the need for an additional vessel or the possibility of killing marine life is eliminated. The one disadvantage of gas-type sound sources is the relatively short life of the flexible container or sleeve in which the explosive gas mixtures are detonated.

In sound sources employing an electrical discharge, it has been customary to discharge a bank of capacitors charged to a high voltage through a single electrode or multiple parallel electrodes and a ground plate. When the capacitor bank is discharged into the water via the electrodes and ground plate, the pressure bubble is produced at each electrode tip, while the ground plate serves as a return for the electrical energy. The pressure bubble produces the desired seismic impulse while the ground adds nothing to the magnitude of the outgoing acoustical wave. In fact, only 3–5percent of the total electrical energy available in the capacitor bank is converted to useful acoustical energy in the water. It is apparent that if it were possible to convert a larger percentage of the available energy into acoustic energy, spark-type sound sources would be more useful.

SUMMARY OF THE INVENTION

The present invention increases the amount of electrical energy converted to acoustic energy by at least 70percent by replacing the ground electrode or ground return by a plurality of parallel electrodes. The positive side of the capacitor bank is connected to one set of parallel electrodes, while the negative side is connected to a second set of parallel electrodes. Preferably the electrodes are alternated or arranged so that a positive electrode is adjacent a negative electrode. When a given quantity of electrical power is discharged through the two sets of parallel electrodes, they produce twice the number of energy bubbles as would be produced by a single set of electrodes and a ground plate. More particularly, an energy bubble is produced at the positive set of electrodes and a second energy bubble produced at the negative set of electrodes. The production of twice the number of energy bubbles increases the overall efficiency of the system by approximately 70 percent.

The electrode arrangement used in the present invention can take various forms. For example, it may consist of a number of flat plates arranged in a manner to form an array having a length and/or width equal to at least one wavelength of the predominant output frequency. This, of course, will insure that the array is a directional array in either or both directions. The combined effect of all of the point sources will be a line source which produces a plane wave propagating downward in a vertical direction. By considering the phases of individual waves emanating from the individual point sources and reaching selected points at various angles from vertical, it will be apparent that cancellation will occur to some extent at all angles except vertical (90°). The significance of an array length of one wavelength is that the ratio of wave energy propagating in the vertical direction to that propagating in any other given direction will be significantly higher for a one wavelength array length than for anything appreciably less than that. Thus, a line source of at least one wavelength is directional. The flat plates are totally covered with a layer of high-impact strength insulation, and a plurality of small holes or openings equally spaced are provided in the insulation covering. The small openings expose discrete areas of the plate surface to form a large number of individual contacts with the aqueous solution in which the electrode assembly is disposed. A minimum of two such plates are totally immersed in the aqueous solution and spaced apart a small distance depending upon the desired size of the energy bubble. Each plate is connected mechanically and electrically to an individual conductor of the transmission line in order that the electrical current from the capacitor discharge may be passed through both conductors and plates to produce simultaneous energy bubbles at the exposed contacts of both plates. The current flow will be between the exposed contacts of both plates, and for each current path between the plates two energy bubbles are formed. Instead of small holes puncturing the layer of insulation, pinlike wire electrode tips may protrude through the insulation layer. In this case the electrode tips would form a large number of individual contacts with the aqueous solution.

A still further arrangement consists of a number of discrete electrode assemblies in the form of streamers arranged to form an in-line array having a length and/or width equal to at least one wavelength of the predominant frequency. Each of the electrode streamers comprises a plurality of discrete electrodes with alternate electrodes being coupled to the same conductor. The capacitor discharge is then applied to the two conductors forming the streamer and the current path is between the adjacent electrodes. Thus, a bubble is produced at each electrode tip.

BRIEF DESCRIPTION OF THE DRAWINGS

The present invention will be more easily understood from the following detailed description of a preferred embodiment when taken in conjunction with the attached drawings in which:

FIG. 7 is a vertical section of a modified form of the electrode assembly of this invention; and FIG. 8 is a plan view of the electrode assembly shown in FIG. 7.

DESCRIPTION OF A PREFERRED EMBODIMENT

As described above, present seismic surveys of water-covered areas utilize three distinct types of sound sources comprising powder or dynamite charges, explosive gas mixtures, and electrical or spark discharges. The latter type of sound source is normally used when a continuous seismic profile of the strata underlying the bottom of a water-covered area is desired. More particularly, the spark-type sound source is used when it is desired to obtain detailed information with high vertical resolution concerning the strata penetrated by the acoustic waves generated with a spark-type sound source. In the past this has been confined to a few hundred feet below the bottom of the water-covered area due to the low energy contained in normal spark-type sources.

Most high-resolution-type spark sound sources have an energy input to an electrode array of 400 to 2,000 joules. It is technically possible to discharge 0.25-million joules in an electrode array providing there are enough electrode tips to handle this energy. The power supply for this system can be built but the problem is to construct an electrode array that will operate in a trouble-free manner.

Figure 1:
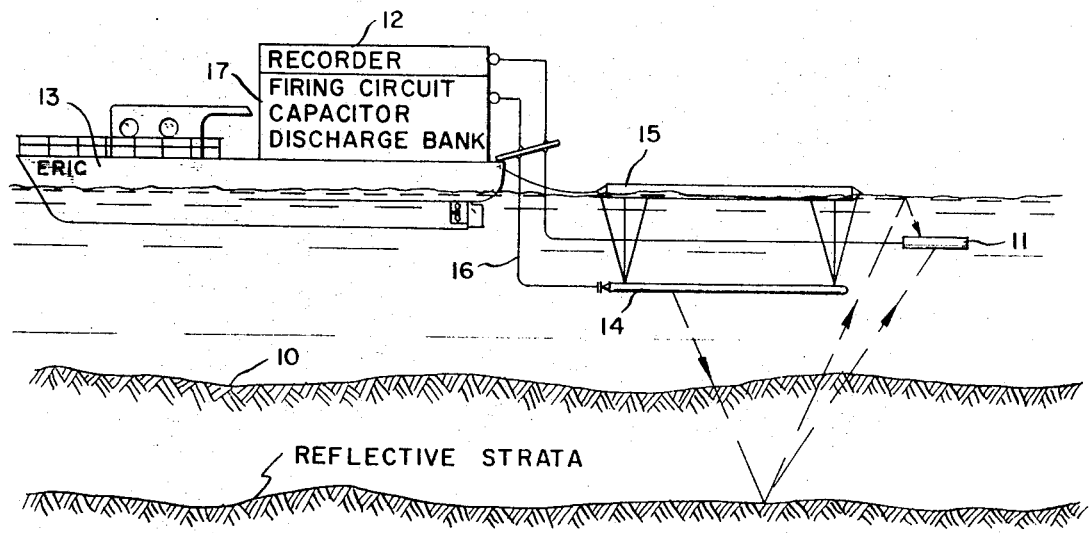
FIG. 1 is a schematic view of a seismic survey utilizing the electrode assembly of this invention.

Referring now specifically to FIG. 1, there is shown schematically a survey vessel utilizing a sound source constructed according to this invention for conducting a continuous seismic profile survey. More particularly, there is shown the bottom 10 of a water-covered area that is to be surveyed. The survey vessel 13 tows a detector string or streamer 11 which is coupled to a recording system 12 on the vessel. As explained, the recording system may utilize either magnetic tape and record the actual electrical signals in an analog or digital form or a visual type of recording and record the electrical signals in a visual form. The streamer comprises a flexible member having a plurality of geophones positioned at intervals thereon and cables for transmitting the geophone signals to the survey vessel. The depth of the streamer below the surface of the water is controlled by various devices known to those skilled in the art. An electrode array 14, constructed according to this invention, is towed either at the same depth or above or below the detector array. More particularly, the electrode array is positioned below a float 15 in order that the depth at which the array is towed may be accurately controlled. The array is coupled by means of a lead 16 to a firing circuit and capacitor bank 17 located on the survey vessel. The firing circuit contains the necessary circuitry for controlling the discharge of the capacitor bank and also controlling the recording system.

Figure 2:
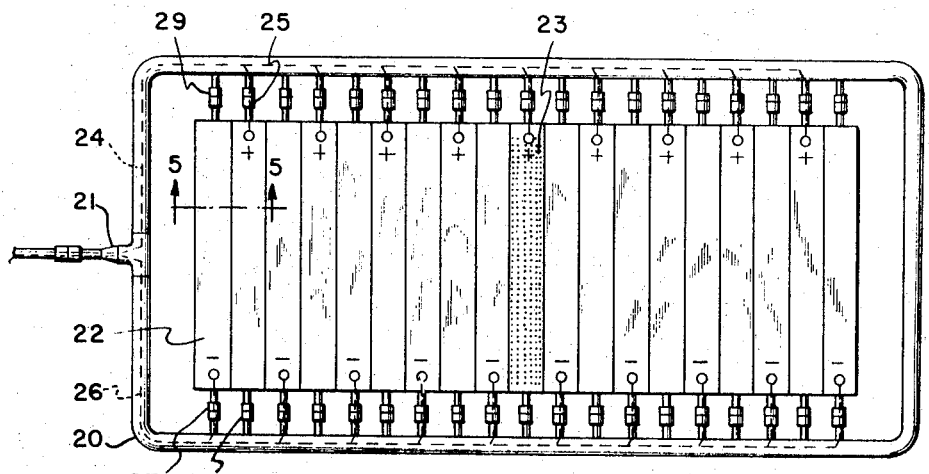
FIG. 2 is a plan view of one form of the electrode assembly of this invention.
Figure 3:
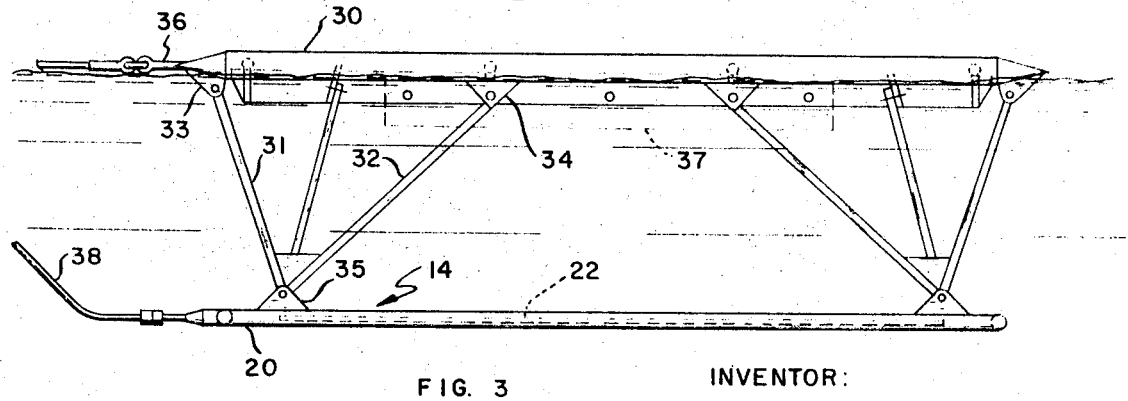
FIG. 3 is a side view of the electrode assembly shown in FIG. 2.
Figure 4:
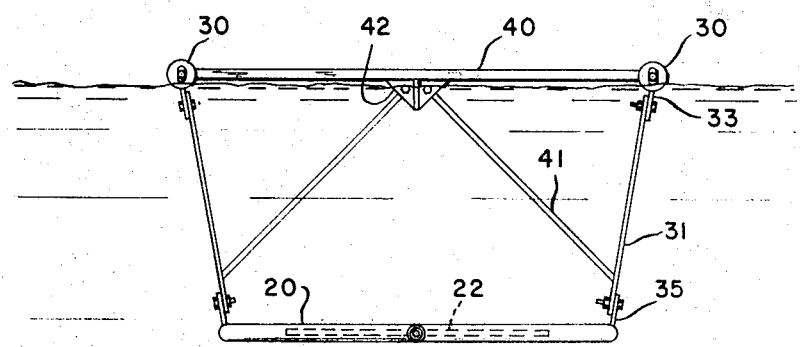
FIG. 4 is an end view of the electrode assembly shown in FIG. 2.

Referring now to FIGS. 2-4, there is shown the construction details of the electrode array shown schematically in FIG. 1. More particularly, in FIG. 2 there is shown a plan view of the array that utilizes an outer tubular frame 20 which may be formed of suitable tubular material, for example, plastic pipe. The outer frame may also be formed from other tubular material such as stainless steel or other metals, providing the electrodes are insulated from the frame. The outer frame is provided with a central terminal 21 through which the two conductors of the transmission line pass.

The individual electrodes are formed by a series of plates 22 positioned in a side-by-side arrangement. The detailed construction of the individual electrode plates is more fully described below with reference to FIGS. 5 and 6. Each of the electrode plates is provided with a plurality of mutually spaced openings in the outer insulating layer that form individual electrodes 23 as shown in one electrode plate. The electrode plates are supported mechanically from the sidewalls of the tubular frame 20 and in addition are coupled electrically to the conductors of the transmission cable. More particularly, the negative electrode plates are coupled by means of a disconnect 27 to the negative conductor 26 of the transmission cable, while their opposite ends are supported by a disconnect coupling 29. In a similar manner the positive electrode plates are coupled by means of a disconnect 25 to the positive conductor 24 of the transmission cable, while their opposite ends are supported by disconnect 28. The disconnects provide both the mechanical strength for supporting the plates and the electrical connections for the plates.

Referring now to FIGS. 3 and 4, there is shown a means for both mounting or supporting the electrode array from a floating framework and towing the array. More particularly, the floating framework consists of two elongated cylindrical floats 30 which are coupled to each other by means of crossmembers 40. The electrode array is supported by means of tubular supports 31 and 32 which are coupled at their upper ends to eyes 33 and 34 on the floats and at their lower ends to an eye 35 positioned on the tubular frame of the electrode array. The electrode array is braced against sidewise movement by means of tubular braces 41 which are attached at their lower ends to the tubular supports 31 and 32 and at their upper ends to an eye 42 suspended from the crossmembers 40. Depending upon the overall weight of the electrode array and the buoyancy of the float members 30, it may be necessary at times to add ballast 37 to the floats to insure that the floats are submerged to the proper depth to improve the towing of the array. A towing bridle is attached to towing eyes 36 at the front of each of the floats 30 and connects to the towing cable on the survey vessel. Similarly, the electrical conductors are coupled to the power cable 38 which couples the array to the power supply and firing circuits on the survey vessel.

Figure 5:
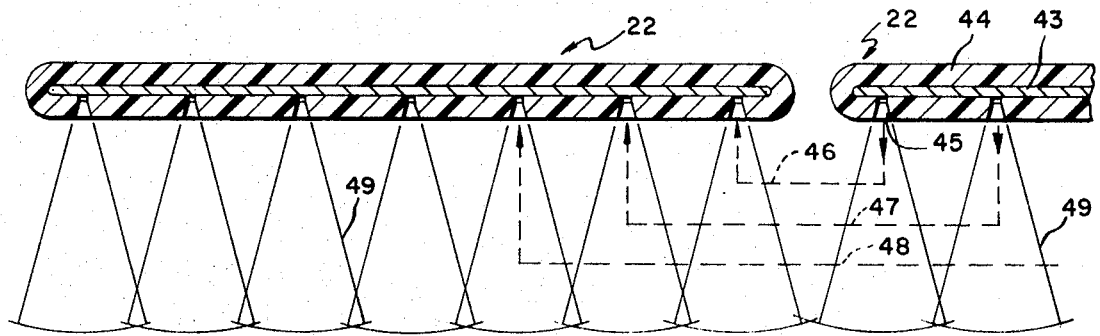
FIG. 5 is a vertical section taken along line 5—5 of FIG. 2 and showing the detailed construction of the individual electrodes.

Referring now to FIG. 5, there is shown a cross section of the electrical plates shown in FIG. 2. Each of the electrode plates comprises an inner plate 43 which may have a dimension of roughly 12 inches by 90 inches and is covered with a high-impact resistant molded plastic insulation 44. The plate, of course, should be formed from a conducting material such as aluminum or copper while the insulation may be a conventional plastic such as nylon or one of the epoxy resins which has good mechanical strength and will adhere to the metal inner plate. Individual areas or openings 45 are formed in the insulation on one surface thereof to provide discrete areas of the inner plate which communicate with the aqueous solution surrounding the array. The individual areas or openings 45 form the individual electrodes of the electrode plate. When the charge on the capacitors is discharged through the plate, the current will travel along paths 46, 47 and 48 between the positive electrodes and the negative electrodes. As show schematically by the expanding wavefronts 49, a bubble will be generated at both the positive and the negative electrodes.

Figure 6:
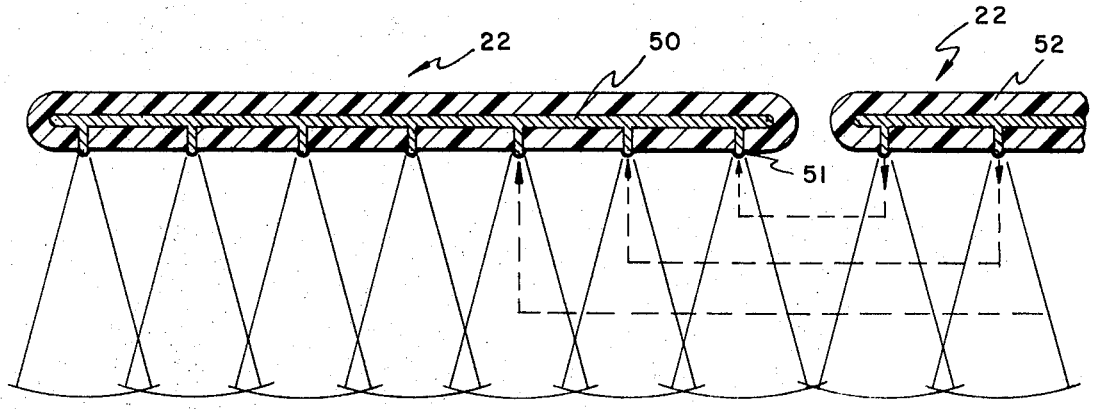
FIG. 6 is a section taken along line 5—5 of FIG. 2 and showing a modified construction of the individual electrodes.

Referring now to FIG. 6, there is shown a modified form of the electrode plate in which an inner plate 50 is provided with a plurality of metal electrode tips 51 which project through molded plastic insulating covering 52. The electrode tips may be small metal wires which are affixed to the plate by various means such as brazing or welding. The plate shown in FIG. 6 will have the same current paths as those shown in FIG. 5 and will generate the same pressure bubbles at both the positive and negative electrodes.

Referring now to FIGS. 7 and 8, there is shown a modified form of the electrode array that may be used in practicing the method of the present invention. The modified electrode array consists of a group of elongated streamers having a plurality of individual electrodes projecting downwardly therefrom. Each streamer comprises a buoyancy tube 60 which is provided with a plurality of spaced hanger clips 61 that support the conductors of the transmission line. More particularly, the conductors 62 and 63 are coupled together at spaced intervals by means of tape 64 or other binding means. The bottom ends of the hanger clips are attached to the portions of the conductors that are coupled together. The positive conductor 63 is provided with a plurality of spaced electrode holders 65 having electrode tips 66 fastened thereto. The individual electrode tips 66 are attached to the holders by various means as by threaded connections or the like. Similarly, the negative conductor 62 is provided with electrode holders 67 having electrode tips 68. Again the electrode tips 68 are screwed into the holders 67. THe electrode holders may be spaced along the two conductors at any desired interval, as for example, between 6 and 24 inches apart. In addition, the electrodes should be alternated between positive and negative electrodes as shown in order for the current path to be completed.

The forward end of the buoyancy tube is provided with a towing ring 70 secured to an upwardly extending ear 71. The ear 71 extends from a transverse tubular member or header 75 from which additional streamers extend as shown in FIG. 8. The header 75 also serves as a manifold for the electrical conductors and for the air pressure which is used to position the depth-controlling fins 83 shown in FIG. 8. Pneumatic pressure is supplied through a line 74 to the header, while the electrical conductors are coupled by a quick disconnect 76 to a power cable 77. The power cable is coupled to the power supply and control circuits on the surveying vessel. A depth-sensing tube 73 is also disposed on the forward end of the electrode array to determine the depth of the array. The signal representing the sense depth can be used to control the pneumatic pressure supplied to the header 75 to position the depth-controlling fins 83.

Referring now to FIG. 8, there is shown the arrangement by which a plurality of streamers 80 are attached to the tubular header 75. Also shown are the depth-controlling fins 83 at opposite ends of the tubular header which, as explained, determine the depth at which the array is towed. The towing cable 72 is attached to the center of the tubular header 75 while suitable stress cables 85, which extend from a yoke 84 to the ends of the tubular header, are provided for insuring the proper alignment of the array.

OPERATION

The arrays shown in FIG. 1 and in FIG. 7 are both operated by coupling the positive electrodes to the positive side of the power supply and the negative electrodes to the negative side of the power supply. As explained, the power supply normally consists of a capacitor bank which is charged to a high voltage and then discharged by a firing signal. The firing signal also controls or coordinates the operation of the recording system. When actuated by firing signal, the capacitors will be discharged through the positive and negative electrodes with the actual current path being from the positive to the negative electrodes. The discharge will generate pressure bubbles at both the positive and negative electrodes that expand and produce the seismic impulse.

The substitution of a plurality of electrodes for the ground plate results in the formation of a pressure bubble at both the positive and negative electrodes. Thus, twice as many pressure bubbles will be formed as in conventional spark-type sound sources. This results in an increase of 70 percent in the overall efficiency for the conversion of the electrical power to useful acoustical energy. As explained, in conventional spark-type sound sources only 4 or 5 percent of the electrical energy is converted to useful acoustical energy. used predominant frequency.

As explained above, the array should have a dimension equal to at least one wavelength of the predominant frequency to provide a directional sound source. The predominant frequency of the generated acoustical energy will depend upon the amount of electrical power discharged at each of the electrodes. For example, if 4 joules of energy were discharged at each electrode, the predominant frequency would be approximately 1000 cycles per second. Similarly, if 8 joules of energy were discharged at each electrode, the predominant frequency would be 800 c.p.s. Thus, the number of electrodes used and the dimensions of the array depend upon the energy to be discharged and the desired predominant frequency. Once these parameters are established, the spacing of the electrodes and the dimensions of the array can be determined.

The predominant frequency and energy to be discharged will be dictated by the general characteristics of the formation to be explored as well as the desired depth of penetration of the exploration. Obviously, for deeper penetration the amplitude of the generated acoustic energy must be increased and the predominant frequency lowered. The use of lower frequencies will require a longer electrode array to provide an array having a length at least equal to one wavelength of the predominant frequency.

I claim as my invention:

1. A spark-type seismic sound source for use in water-covered areas comprising:
    A plurality of electrodes, said electrodes being spaced and separated from one another with conductors connecting the electrodes being heavily insulated whereby only specifically defined small-area electrode surfaces are exposed to the water, the electrodes being disposed in an array having at least one dimension equal to one wavelength of the predominant frequency of said source; and
    a power supply, said power supply having a positive and negative conductor, said positive conductor being coupled to approximately one-half of said electrodes and said negative conductor being coupled to the remaining electrodes, whereby spark discharge occurs between small-area electrodes and a bubble results at each electrode.

2. The sound source of claim 1 wherein said electrodes comprise a series of flat plates covered with a layer of insulation material, said insulating layer being punctured by a plurality of mutually spaced openings, said flat plates being disposed in a side-by-side arrangement with alternate plates being coupled to the same conductor of the power supply.

3. The sound source of claim 1 wherein said electrodes comprise an elongated streamer, said streamer being provided with a plurality of electrodes projecting therefrom, alternate electrodes being coupled to the same conductor of the power supply.

4. The sound source of claim 3 wherein said streamer comprises an elongated buoyancy tube, a pair of conductors being suspended from said buoyancy tube, a plurality of spaced electrodes extending from said conductors, said electrodes being aligned along a substantially straight line and alternate electrodes extending from the same conductor, said conductors being connected to said power supply.

5. A method for generating seismic impulses over water-covered areas comprising:
    disposing a plurality of separate and discrete electrodes in the water, the electrodes having specifically defined small-area exposed surfaces spaced from one another;
    coupling some of the electrodes to one side of a power supply and coupling the remaining electrodes to the other side of the power supply; and
    producing an electrical discharge between the electrodes coupled to opposite sides of the power supply whereby spark discharge occurs between adjacent small-area electrodes and a bubble results at each electrode.

6. The method of claim 5 wherein said electrodes are disposed in an array having a dimension equal to at least one wavelength of the predominant frequency of the discharge.